Dec. 13, 1955  G. DOWNING  2,726,616
PORTABLE WELDING MACHINE
Filed Dec. 27, 1951  2 Sheets-Sheet 1
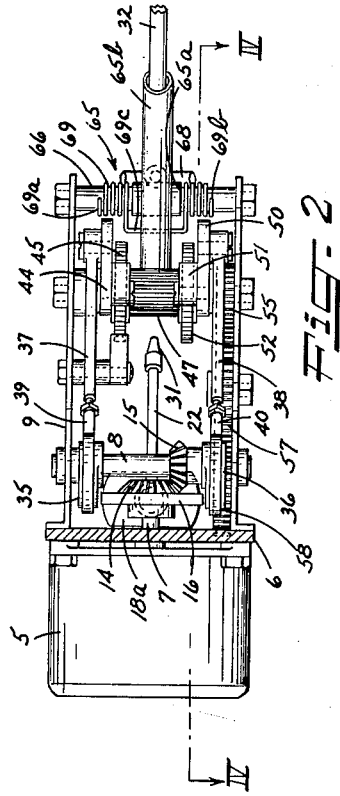
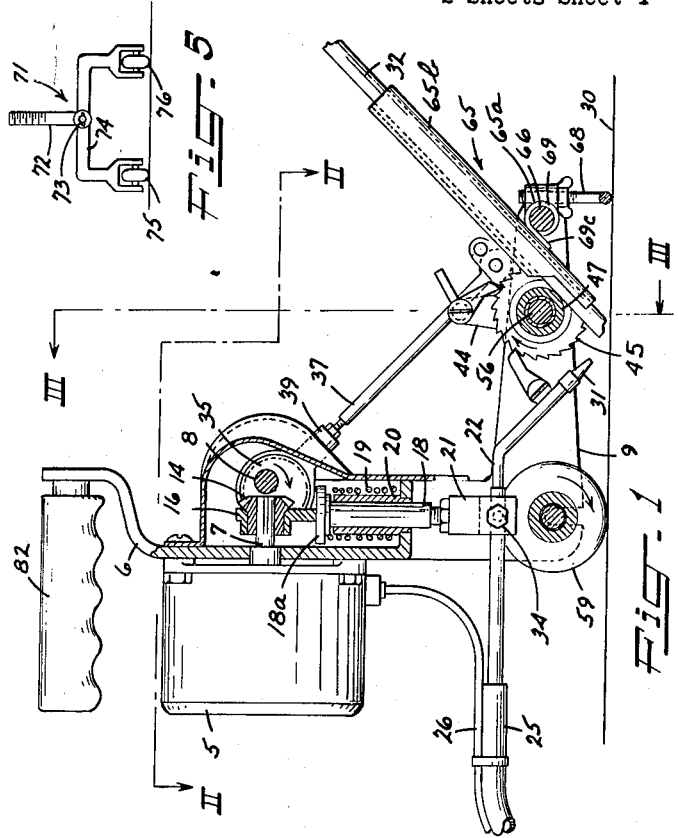
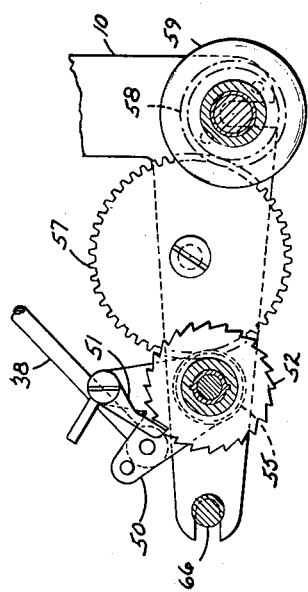
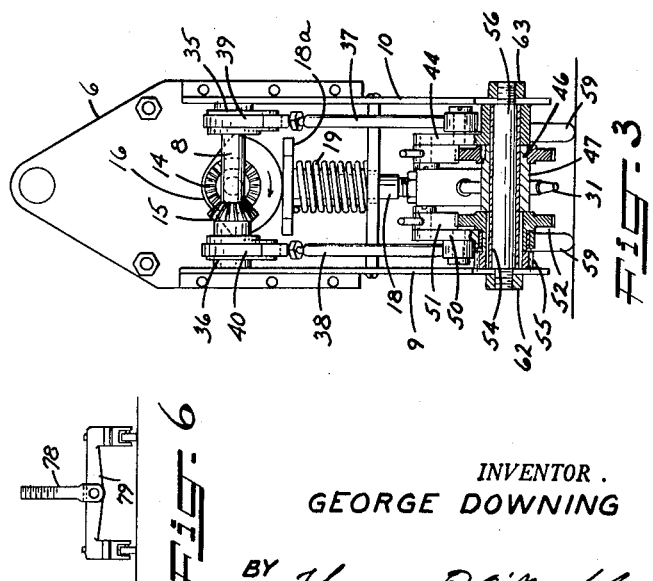
INVENTOR.
GEORGE DOWNING
BY Thomas R. O'Nally
ATTORNEY.

Dec. 13, 1955    G. DOWNING    2,726,616
PORTABLE WELDING MACHINE
Filed Dec. 27, 1951    2 Sheets-Sheet 2
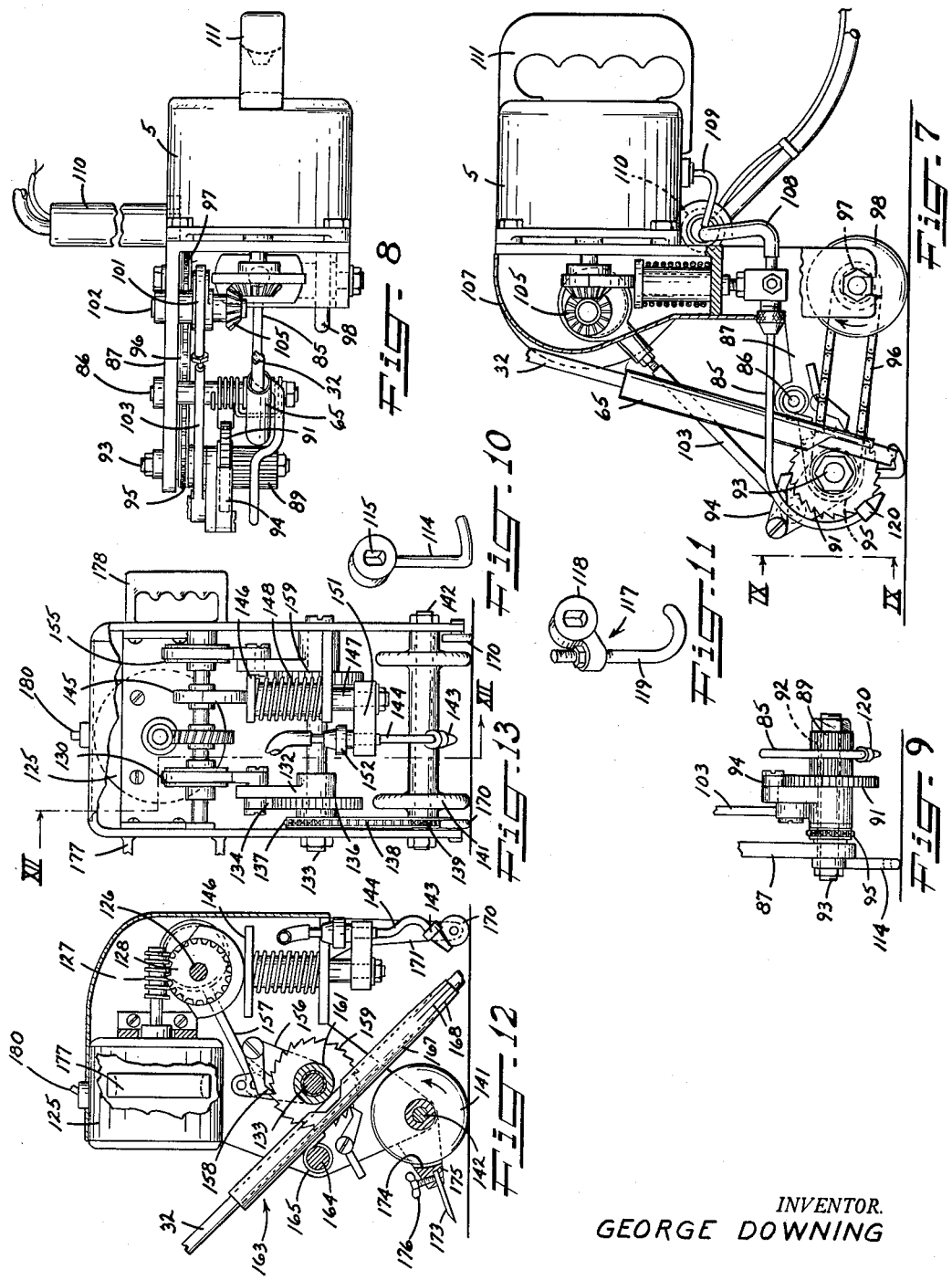
INVENTOR.
GEORGE DOWNING
BY Thomas B. O'Nally
ATTORNEY.

United States Patent Office 2,726,616
Patented Dec. 13, 1955

2,726,616

PORTABLE WELDING MACHINE

George Downing, Parkersburg, W. Va., assignor to American Viscose Corporation, Wilmington, Del., a corporation of Delaware Application December 27, 1951, Serial No. 263,677

5 Claims. (Cl. 113—59)

This invention relates to welding apparatus, and particularly to a type suitable for automatic operation in the welding of metals having low-melting temperatures, such as lead, and thermoplastic resins. The apparatus which is hereinafter described is quite useful in the art known as lead-burning, particularly to form continuous joints between sheets, plates, or other articles of lead, and to form continuous layers of lead on the flat surfaces of other materials such as steel, concrete, or wood by laying progressively formed juxtaposed fillets of lead fused together to form a continuous non-perforate layer. Although the invention is applicable broadly to the working of thermoplastic materials having melting-point temperatures of the order of that of lead or lower temperatures, the description of the invention is to be facilitated herein by reference to the working of lead.

An object of the present invention is to provide a portable automatic welding machine, particularly a machine adapted to weld lead, which is easily and manually maneuverable with respect to a work-piece. It is another object to provide an automatic welding machine that may be operated independently of a platform or other support for holding the work, but instead, may be applied directly to the work which serves as a support for the machine during operation. It is a further object to construct a machine capable of producing continuous weld joints or fillets by being self-propelled through traction obtained by engagement with a workpiece. Other objects, features and advantages will become apparent from the following description of the invention and the drawing relating thereto in which Fig. 1 is an elevation view partly in section of one embodiment of the invention;

Fig. 2 is a plan view partly in section taken along line II—II of Fig. 1;

Fig. 3 is a section view taken along line III—III of Fig. 1;

Fig. 4 is a fragmentary section taken along line IV—IV of Fig. 2;

Fig. 5 illustrates a modified support device that may be substituted in the apparatus illustrated in Figs. 1 to 4;

Fig. 6 illustrates still another modified support device;

Fig. 7 is an elevation view, partly in section, of a modified welding machine;

Fig. 8 is a plan view with parts removed of the apparatus shown in Fig. 7;

Fig. 9 is a fragmentary end view of the apparatus shown in Figs. 7 and 8;

Fig. 10 is a pictorial view of a support element for the machine illustrated by Figs. 7 to 9;

Fig. 11 is a pictorial view of a modified support;

Fig. 12 is an elevation in section of a modified welding machine taken along line XII—XII of Fig. 13; and Fig. 13 is an end view of the apparatus shown in Fig. 12.

In brief, a welding machine is provided in accordance with the present invention in the form of a portable self-propelled unit that may be carried, or lifted, to a work surface by an operator. The machine comprises a motor, preferably electrical, mounted on a frame, a rotor which extends from the frame to engage the work and propel the machine, a heating element which is reciprocable in a direction toward and away from the work, and a mechanism for feeding a fusible material toward the area of the work to which the heating medium supplied by the element is directly applied. The movements of the rotor, the burner, and the mechanism for feeding the fusible material are intermittent and are produced and coordinated in cyclical relationship by suitable mechanism connecting these movable portions of the machine with the motor.

As shown in Fig. 1, a drive unit 5 comprising a motor and a chain of reduction gears is bolted to a frame member 6. A drive shaft 7 extends outwardly from the unit 5 through the member 6 at right angles to a shaft 8 which is rotatably supported by, and extends transversely between and through, two parallel frame members 9 and 10. The shafts 7 and 8 are connected in drive relationship by a pair of miter gears 14 and 15. Secured to the hub portions of the gear 14 is a cam 16, known hereinafter as the burner cam, which reciprocates a plunger 18 which supports a burner assembly. The plunger 18 is urged toward the cam by a compression spring 19 which stands between the plunger head 18a and a portion of the frame member 6 extending normally to the axis of the plunger. The plunger reciprocates within a cylindrical guide 20 secured at its lower end to the periphery of an aperture through the frame member 6. The plunger 18 has a lower threaded end-portion to which is attached a holder 21 for a burner tube 22. The burner tube terminates within the end-portion of a flexible base or tube 25 connected to a suitable gaseous fuel supply source (not shown). A conventional wire cord 26 which connects the motor of the unit 5 with an electrical power circuit is attached to the tube 25 to minimize tangling of the cord and the hose. The burner tube 22 is adjustable within the holder 21 in a direction parallel with a work surface 30 to enable adjustment of the burner nozzle 31 toward and away from the lower end of a fusible rod 32. The holder 21 is provided with a set screw 34 which may be adjusted to engage the tube 22 to hold the tube in a desired horizontal adjustment. The set screw may be loosened with respect to the tube 22 for making horizontal aadjustment of the burner tube, and tightened to maintain the desired adjustment.

To shaft 8 on portions thereof adjacent the frame members 9 and 10 are secured cams 35 and 36 of the eccentric drive units for reciprocating a pair of connecting rods 37 and 38. The upper threaded portions of the connecting rods terminate in respective cam followers 39 and 40 with respect to which the rods are longitudinally adjusted within threaded bores of the cam followers for satisfactory connection with respective pawl-and-ratchet mechanisms which the rods drive. The lower end of the connecting rod 37 is pinned in pivotable connection with a pawl support 44. The pawl connected thereto engages the periphery of a ratchet wheel 45 which is keyed to a shoulder portion 46 of a corrugated rod-advancing roll 47.

The lower end of the other connecting rod 38 is pinned in pivotable connection to a pawl support 50. The pawl 51 secured thereto engages the periphery of a ratchet wheel 52. The ratchet wheel 52, and a gear 55 are keyed to a sleeve 54 which is rotatable about the shaft 56; the pawl support 50 is rotatable with respect to, and supported on, the exterior surface of the sleeve 54. The gear 55 is the initial gear of a chain of gears shown in Fig. 4 for transmitting the intermittent rotation of the ratchet wheel 52 to a rotor 59 which extends radially beyond the frame members 9 and 10 to engage a work surface. As shown in Fig. 4, gear 55 meshes with an intermediate gear 57; the latter gear meshes with a gear 58 connected in coaxial and fixed relationship with the propulsive rotor 59. The shaft 56 extends transversely of the frame to generally support the pawl supports 44 and 50, the ratchet wheels 45 and 51, the roll 47 and the gear 55. The shaft 56 has threaded end-portions of smaller diameter than that of the intermediate portion of the shaft to provide shoulders against which the frame members 9 and 10 may be secured by nuts 62 and 63.

The welding rod 32 is supported within the machine by a holder 65 which has a portion 65a attached, as by welding, to the tubular rod-holding portion 65b. Portion 65a is provided with a bore to receive a shaft 66 on which the holder is supported and also with a bore aligned generally perpendicularly to the work surface to receive the shank portion of a rest or support 68 which slides over the surfaces of the work during operation. A spring 69 having end-portions 69a and 69b fastened to or embedded in the shaft 66 and a transverse portion 69c pressing against the lower section of the rod-holder portion 65b, forces the rod against the corrugated peripheral surface of the roll 47. The support 68 is adjustable within its bore of holder 65 to position the burner nozzle 31 and the lower extremity of the rod 32 at desired elevations over the work surface 30. In the presently described embodiment as well as the other embodiments herein described, the tubular portion of the rod holder is aligned preferably to feed the rod toward the work plane at an angle of 30 to 60 degrees therewith. The burner nozzle is disposed at the opposite side of the immediate area to which the rod is fed and aligned to project flame toward such area at an angle of 30 to 60 degrees. Preferably, the inclinations of the rod holder and the nozzle with respect to the work plane are such that the angle between the converging rod and the flame is approximately 90 degrees. Quite satisfactory operation is obtained when the flame and the rod approach the work plane at angles of approximately 45 degrees.

Fig. 5 illustrates a support 71 which may be used in place of the support 68 and comprises a threaded shank element 72 having a clevis-end portion 73 in pivotable relationship with a U-shaped element 74. At the lower extremities of the legs of elements 74 are secured rollers 75 and 76. This type of support is suitable when the character of the work is such that the joints or fillets to be made extend in a straight line. In Fig. 6 is illustrated a castor-type support comprising a threaded shank element 78 having a clevis-end portion, a cross member 79 and a pair of castor-mounted rollers 80 which swivel with respect to the cross member about axes normal to a work surface. The support of Fig. 6 is preferred when the joints or fillets to be made by the machine extend in curved or irregular paths and considerable attention is required of the operator to guide the machine to follow a desired path. The castor-type support facilitates the guiding of the machine along a devious path whereas the type of support illustrated in Fig. 5 tends to hold the machine to a straight path. A support having a single castor or roller may be provided, if desired. However, in most instances, a support having two spaced rollers or castors such as illustrated in Figs. 5 and 6 will be more satisfactory since the rollers or castors may straddle a weld path to roll over the relatively smooth surfaces of the work at both sides of the path. A handle 82 is secured to the frame of the machine to facilitate the lifting, handling and guiding thereof.

A machine constructed in accordance with the embodiment hereinabove described operates very satisfactorily when the drive unit 5 comprises a $\frac{1}{40}$ horse power motor having a speed of 1725 revolutions per minute, and a standard gear reduction head for reducing the speed of the motor to that of the output shaft 7 at approximately 57 revolutions per minute. These speeds and the power rating of the motor are not critical and may be varied substantially to suit operating conditions. As the gears 14 and 15 are miter gears, the speed of the shaft 8 is the same as that of shaft 7. Consequently, the intermittent motions of a machine equipped with such a unit, i. e. the rotation of the rotor 59, the advancement of the rod 32 toward the work surface 30, and the up and down motion of the burner 31 are governed to 57 movements per minute. A casual observation of the burner cam 16, as shown in Fig. 3, will indicate that the burner stays in its lowest position for one half of a cycle and is reciprocated away from and toward the work during the other half of its cycle. The cams 35 and 36 are arranged in timed relationship with the burner cam 16 so that the pawl mechanisms related to the eccentric cams produce advancement of the machine and movement of the rod toward the work during the half of the cycle in which the cam 16 is moving the burner through its upward and downward strokes. This period corresponds to the interval during which the periphery of the non-circular portion of the cam 16 engages the head 18a of the plunger 18. The shaft 7 rotates in the direction indicated by the arrow drawn on the cam 16 in Fig. 3 to produce clockwise motion of the shaft 8 as viewed in Fig. 1. The set of the teeth of the ratchet 52 of the ratchet mechanism connected with connecting rod 38 is such as to produce rotation of the movement of the rotor 59 in the direction indicated by the arrow drawn thereon in Fig. 1. Consequently, the machine moves in a direction toward the right as viewed in Fig. 1, such direction extending transversely with respect to the axis of the rotor 59. As shown, the rod 32 is supported by the holder 65 slightly in advance of the burner 31 with respect to the direction of movement of the machine relative to the surface 30.

Figs. 7 and 8 illustrate a modified machine which may be operated closely to walls or other barriers which interfere with movement of the machine along the plane of the work surface, to form welds or fillets which extend in a direction toward and away from such barriers. The machine has a drive unit 5, such as provided in the previously described embodiment, and a similar cam and plunger mechanism for reciprocating a burner tube 85. The rod holder 65 is constructed substantially as described with respect to Figs. 1 and 2. The holder is supported on a stationary cantilever shaft 86 secured to the frame member 87. The rod 32 is intermittently carried toward the work by a mechanism similar to that used in the earlier described embodiment and comprises a rod-advancing roll 89 and a ratchet wheel 91 secured to a sleeve 92 which turns about a cantilever shaft 93 secured to the frame member 87. The sleeve 92 is keyed to the roll 89 and the wheel 91, and extends coaxially through the hub of a pawl support 94 and the bore of a sprocket 95. The sprocket is keyed to the sleeve for rotation with the ratchet wheel and the roll. The pawl support, however, is not secured to the sleeve and may turn relatively to the sleeve in bearing relationship therewith. The sprocket 95 is connected by a chain 96 to a sprocket 97 fastened to a traction rotor 98 of the machine. Thus the rod 32 is advanced toward the work and the machine is propelled relative to the work by a single eccentric drive system. The ratchet drive just described is driven from an eccentric 101 supported by shaft 102 by means of a connecting rod 103. The driving disc of the eccentric and the bevel gear 105 of the miter set which transmits power from the unit 5 to the eccentric 101 are preferably secured together and rotatable with respect to the shaft 102. A hood 107 encloses the eccentric and the push-rod system for reciprocating the burner. The burner tube 85 is connected with a flexible tube 108 which extends with a cord 109 for feeding electrical power to the unit 5 through a handle 110 to respective supply sources of fuel and electrical power. To further facilitate the handling of the machine, a handle 111 is attached to the end of the power unit 5.

To render the machine illustrated in Figs. 7 to 9 self-supporting in a position for welding with respect to the work surface, a support member, such as the member 114 illustrated in Fig. 10, is provided as shown in Fig. 9. The supporting member has an aperture 115 having opposite flat parallel sides which are complementary to flattened surfaces of the threaded end-portion of the shaft 93 whereby the member 114 may be held by the end of the shaft by a nut for the threaded shaft portion turned tightly against the member. Fig. 11 illustrates a support 117 which may be substituted for the one illustrated in Fig. 10. Support 117 has two elements 118 and 119 of which the element 118 is secured in the manner described for member 114; the element 119 has a portion in threaded relationship with an aperture of element 118 whereby adjustments may be made to change the spacing of the burner nozzle 120 relative to the surface of the work piece.

The embodiment just described has the advantages of somewhat simplified mechanical construction resulting from a single eccentric drive for advancing the welding rod and propelling the machine, ready observation of the area of the work being engaged by a flame discharged from the burner, and construction such that the machine may be applied to work areas close to walls or other obstructions.

Figs. 12 and 13 illustrate a further embodiment of the invention which has the advantages of good vision of the welding operation, ability to weld close to walls, etc., and compact and simplified construction. The machine illustrated comprises a motor 125 connected with a shaft 126 by the worm 127 and a worm gear 128. A worm drive is selected such as to obtain a desired reduction from the speed of the motor. For example, when a motor of standard design having a speed in the approximate range of 1750 to 1800 revolutions per minute is used, the drive reduction should be approximately in the ratio of 30 to 1 to obtain approximately 60 revolutions per minute of the shaft 126 and a like number of the various movements produced in the machine. Three separate motions are produced by rotation of the shaft 128. Considering them with reference to Fig. 13 and proceeding in a direction from left to right along the shaft 128, movement of the machine relative to work is derived through an eccentric 130 connected by a connecting rod 131 to a pawl holder 132 which is pivotally supported by the shaft 133. The pawl 134 engages the periphery of the ratchet wheel 136. A sprocket 137, also supported on the shaft 133, is secured to the ratchet wheel 136 for rotation therewith. The sprocket is connected by a chain 138 to another sprocket 139 rotatably supported on shaft 142. The latter sprocket is secured coaxially to a traction rotor 141 which propels the machine over a work surface.

Next of the motions generated from shaft 128 is the reciprocation of the burner assembly comprising a nozzle 143 and a feed tube 144 therefor. Reciprocation of the assembly is effected by rotation of cam 145 secured to the shaft 128 with its periphery in engagement with the head 146 of a plunger or push-rod 147. The push-rod is urged into engagement with the cam by a spring 148. A block 151 secured to the lower end of the push-rod has attached thereto a chuck 152 which facilitates vertical adjustment of the burner assembly, or rotation thereof with respect to the axis of the chuck and an aperture contiguous therewith provided for the tube through the block 151. The block 151 is also swingably adjustable with respect to the axis of the push-rod on the lower threaded portion of the push-rod for adjustment of the burner nozzle toward or away from the welding rod 32 in a horizontal direction.

The mechanism for feeding the rod 32 is the third and last described intermittent motion derived from the shaft 128. To effect the required motion, an eccentric 155 mounted on the shaft 128 is connected with a pawl holder 156 by a connecting rod 157. The pawl 158 supported by the holder engages the periphery of a ratchet wheel 159. The ratchet wheel and an advancing-roll 161 are secured together for rotation about the shaft 133. The roll 161 has a peripheral surface which is preferably corrugated to provide good frictional contact with a portion of the rod 32 exposed by an adjacent cut-out section of a rod holder 163. The rod holder 163 is supported on a cantilever shaft 164 and urged in a counterclockwise direction (see Fig. 12) about the shaft by a spring 165. The holder 163 is very similar in construction to the rod holders of the previously described embodiments except that a longer tubular portion 167 is required on account of the greater spacing of the rod-advancing roll 161 from the work surface. The lower part of the tubular portion 167 comprises a plurality of flexible fingers 168 which press inwardly against the rod 32. In this manner, sufficient friction is exerted on a substantially used rod which has passed below the point of engagement with the roll 161 to prevent the rod from dropping out of the holder onto the work piece. When such a rod has been consumed to the extent that it loses contact with the roll, another rod may be fed into the upper end of the holder to engage the advancing roll. This last inserted rod will then force the fragment of rod remaining in the lower portion of the holder toward the work.

To support the trailing portion of the machine, i. e., the portion in the vicinity of the burner nozzle 143, a pair of rollers 170 are attached separately to separate extensions 171 of the machine frame spaced laterally from opposite sides of the nozzle.

Since on frequent occasions the weld path must be scraped before forming a weld joint or fillet in order to obtain finished work free from defects such as pin-holes, a blade 173 is attached to the forward portion of the machine. Support structure for the blade comprises a pair of frame extensions 174 extending at opposite ends of the traction rotor 141 radially beyond the periphery of the rotor, and a cross member 175 which is longitudinally recessed to receive an edge of the blade. Means such as a set screw 176 holds the blade in the recessed cross member so that the blade may be quickly removed when, for example, it is to be sharpened. A pair of handles 177 and 178 are attached to opposite sides of the frame to facilitate the handling and steering thereof. In performing the scraping operation, the machine may be tilted forward until it is supported on the work by the blade 173. As the machine is pulled forward, its weight produces sufficient pressure on the blade for cleaning or scraping the surface along which a weld joint is to be formed. If a back and forth motion of the machine is required to accomplish satisfactory scraping, the machine is tilted backwardly on the rollers 170 for the return stroke. While scraping, the motor is preferably stopped by a switch 180 mounted on the motor 125.

In providing a portable self-propelled welding machine in accordance with the present invention, equivalent structures and substitutions will occur to those skilled in the art of welding. For example, the rotative power required may be supplied by a small internal combustion engine mounted similarly as the electrically energized unit 5, and operating simultaneously with the burner on fuel supplied from the same source. While hydrogen is a fuel commonly used for lead-burning, other fuels, both liquid and gaseous, may be used in combination with, or without, oxygen by providing suitable burner nozzles of conventional design.

While preferred embodiments of the invention have been shown and described, it is to be understood that changes and variations may be made without departing from the spirit and scope of the invention as defined in the appended claims.

We claim:

1. A self-propelled welding machine having a frame, a motor mounted in said frame, a burner vertically reciprocable in said frame and positioned to direct a flame against a work-piece, a welding rod supply conduit mounted in said frame to direct a welding rod towards a predetermined area on the work-piece, at least one driving wheel on the frame, a camshaft driven by the motor, means actuated by said camshaft for oscillating the burner into and away from said area of the work-piece towards which the rod is directed, means actuated by said camshaft for intermittently advancing the welding rod to said area, and means actuated by said camshaft for intermittently turning the driving wheel to advance the machine along the work surface, the cams on the camshaft being so constructed and arranged that the welding rod is advanced simultaneously with the forward movement of the machine when the burner is oscillated to a position away from said area.

2. A self-propelled welding machine having a frame, a motor mounted in said frame, a burner vertically reciprocable in said frame and positioned to direct a flame against a work-piece, a welding rod supply conduit mounted in said frame, at least one driving wheel on the frame, a camshaft driven by the motor, means actuated by said camshaft for reciprocating the burner towards and away from the surface of the work-piece, means actuated by said camshaft for intermittently advancing the welding rod into the path of the burner flame, and means actuated by said camshaft for intermittently turning the driving wheel to advance the machine along the work surface, the cams on the camshaft being so constructed and arranged that the welding rod is advanced simultaneously with the forward movement of the machine when the burner is raised.

3. A portable, compact lead-burning machine comprising a frame, a drive wheel journaled in said frame for intermittently advancing the machine with respect to the surface of a stationary work-piece, a torch mounted on the frame, a holder for fusible material mounted on the frame and positioned to direct a length of fusible material towards the surface of the work-piece heated by the torch, a motor mounted on the frame, driving means between the motor and the torch for reciprocating the torch vertically towards and away from the surface of the work-piece, driving means connecting the motor and the fusible material for advancing the fusible material when the torch is raised and locking the fusible material when the torch is lowered, driving means connecting the motor and the drive wheel for advancing the entire machine when the torch is raised and holding the machine stationary when the torch is lowered.

4. Apparatus in accordance with claim 3 in which the torch and the fusible material are directed towards the surface of the work-piece at angles of substantially 45° and in which the machine moves in the direction in which the torch points.

5. Apparatus in accordance with claim 3 having a gaseous supply conduit for the torch extending vertically in a path adjacent one extremity of the framework, and an offset mounting for the torch connecting said torch to the reciprocating means.

UNITED STATES PATENTS

References Cited in the file of this patent

| | | |
|---|---|---|
| 1,477,538 | Carter | Dec. 18, 1923 |
| 1,499,498 | Bienenstok | July 1, 1924 |
| 1,938,819 | Eskilson | Dec. 12, 1933 |
| 2,258,670 | Anderson | Oct. 14, 1941 |
| 2,427,696 | Trombetta | Sept. 23, 1947 |
| 2,466,143 | Young | Apr. 5, 1949 |
| 2,524,896 | Downing | Oct. 10, 1950 |